United States Patent [19]

Beriont

[11] Patent Number: 5,479,202
[45] Date of Patent: Dec. 26, 1995

[54] TELEVISION RECEIVER FOR ACCESSING SWITCHED BROADBAND NETWORKS

[75] Inventor: Walter J. Beriont, Lexington, Mass.

[73] Assignee: GTE laboratories Incorporated, Waltham, Mass.

[21] Appl. No.: 319,171

[22] Filed: Oct. 6, 1994

Related U.S. Application Data

[63] Continuation of Ser. No. 146,476, Nov. 1, 1993, abandoned.

[51] Int. Cl.$^6$ ................................................ H04N 7/173
[52] U.S. Cl. .................... 348/7; 348/10; 348/12; 455/5.1
[58] Field of Search ........................ 455/4.1, 4.2, 3.1, 455/5.1, 6.3; 348/6, 7, 10, 12, 13; 359/109, 113, 152, 154; 375/219, 220

[56] References Cited

U.S. PATENT DOCUMENTS

| 4,441,180 | 4/1984 | Schussler | 358/86 |
|---|---|---|---|
| 4,709,418 | 11/1987 | Fox et al. | 358/86 |
| 4,760,442 | 7/1988 | O'Connell et al. | 455/4.2 |
| 4,769,833 | 9/1988 | Farleigh et al. | 455/4.2 |
| 4,787,085 | 11/1988 | Suto et al. | 358/86 |
| 5,136,411 | 8/1992 | Paik et al. | 348/10 |
| 5,142,532 | 8/1992 | Adams | 455/5.1 |
| 5,181,106 | 1/1993 | Sutherland | 358/86 |
| 5,262,883 | 11/1993 | Pidgeon | 455/3.1 |

Primary Examiner—Reinhard J. Eisenzopf
Assistant Examiner—Nguyen Vo
Attorney, Agent, or Firm—Victor F. Lohmann, III; J. Stephen Yeo

[57] ABSTRACT

A network interface module operably connected to a subscriber's television receiver and to a switched broadband digital network includes a fiber-compatible digital transceiver. A downlink receiver in the transceiver detects video/audio/data information that is time-multiplexed within a serially transmitted digital signal optically transmitted by the switched digital network as a broadband digital downlink channel. The detected information is decoded into a parallel format of video/data samples, audio samples, and recovered sample clock that are applied to a digital switch in the television receiver.

1 Claim, 7 Drawing Sheets

TELEVISION RECEIVER FOR ACCESSING SWITCHED BROADBAND NETWORKS

This is a continuation of application Ser. No. 08/146,476 filed on Nov. 1, 1993 now abandoned.

FIELD OF THE INVENTION

This invention relates to television receivers and, more particularly, to a fiber-compatible transceiver accessing audio/data/video information from switched digital networks.

BACKGROUND OF THE INVENTION

There are two principal classes of networks that provide information throughout the United States: broadcast and point-to-point. These two classes of networks are fundamentally different, and therefore have emphasized different types of services. Broadcast networks, such as over-the-air and cable television, mainly provide non-interactive entertainment, while point-to-point networks, such as the public telephone network, provide interactive personal communications. Recent technological advances, however, have given the architecturally-different networks the capability to compete for the same customers.

For example, broadband switching technology enables telephone companies to make switched high-capacity point-to-multipoint connections which can provide broadcast-type services. Alternatively, cellular technology is affording opportunities for the broadcast industry to provide personal communications.

In order to fully utilize these diverse new network capabilities, the consumer must have access to receiver equipment with the appropriate network interfaces.

OBJECTS OF THE INVENTION

It is a principal object of the present invention to obviate the above-noted and other disadvantages of the prior art.

It is a further object of the present invention to provide a receiver having a network interface module for communicating with a switched digital network.

It is a further object of the present invention to provide a fiber-compatible receiver interface enabling a subscriber to interactively request television services and information from a switched digital network connected to the receiver interface.

It is a yet further object of the present invention to provide a fiber-ready transceiver serving as the network interface to a switched digital network for decoding audio/video/data information transmitted from the switched network.

SUMMARY OF THE INVENTION

The present invention is directed to a network interface module operably connected to a subscriber's television receiver and to a switched broadband digital network, and comprising a fiber-compatible digital transceiver. The transceiver comprises a downlink receiver for detecting encoded video/audio/data information serially transmitted on a broadband digital downlink channel from said switched digital network, and means coupled to said downlink receiver for decoding said detected information into a parallel format of video/data samples, audio samples, and recovered sample clock.

DETAILED DESCRIPTION OF PREFERRED EMBODIMENTS

The present invention is directed to a fiber-ready transceiver including a fiber-compatible network interface module operably connected to a consumer's television receiver for providing interactive communications with a switched broadband digital network. The network interface module is a fiber-compatible, audio/video/data digital transceiver including a means for decoding audio, data, and video information transmitted on a downlink channel from the switched network. Preferably, the audio/video/data signals are time-multiplexed within a serially transmitted digital signal. An uplink channel sends control information to the switched network for interactively requesting selected television services.

In order to facilitate an understanding of the fiber-ready transceiver of the present invention, the detailed description of the transceiver will be followed by a discussion of the switched broadband network and an encoder to illustrate the operation of the fiber transceiver in a fully integrated system.

The fiber-ready network interface module of the present invention is integrally configurable within existing television receivers, which receive broadcast signals via an antenna or coaxial cable and video/audio baseband signals via baseband connectors.

The fiber-ready interface module receives time-multiplexed audio, data, and video information transmitted by the switched digital network as light pulses supplied through an optical fiber on a downlink channel. The interface module converts the pulses into a digital bit-stream for processing. Bit and byte timing information is recovered from the bit-stream and used to determine the byte boundaries that contain the audio, data, and video samples. The samples are reconstructed and provided to the audio and video television processors with a reconstructed sample clock.

The network interface module also has an uplink control channel used to relay keystrokes from the consumer's/subscriber's remote keypad. Uplink data are subscriber's commands used to configure the broadband switch in a central office for program selection or forwarded to service providers of interactive programs.

With respect to the following discussion of FIGS. 1–4, similar elements, functional blocks, and devices among the drawings are labelled with identical reference numbers.

Figure 1:
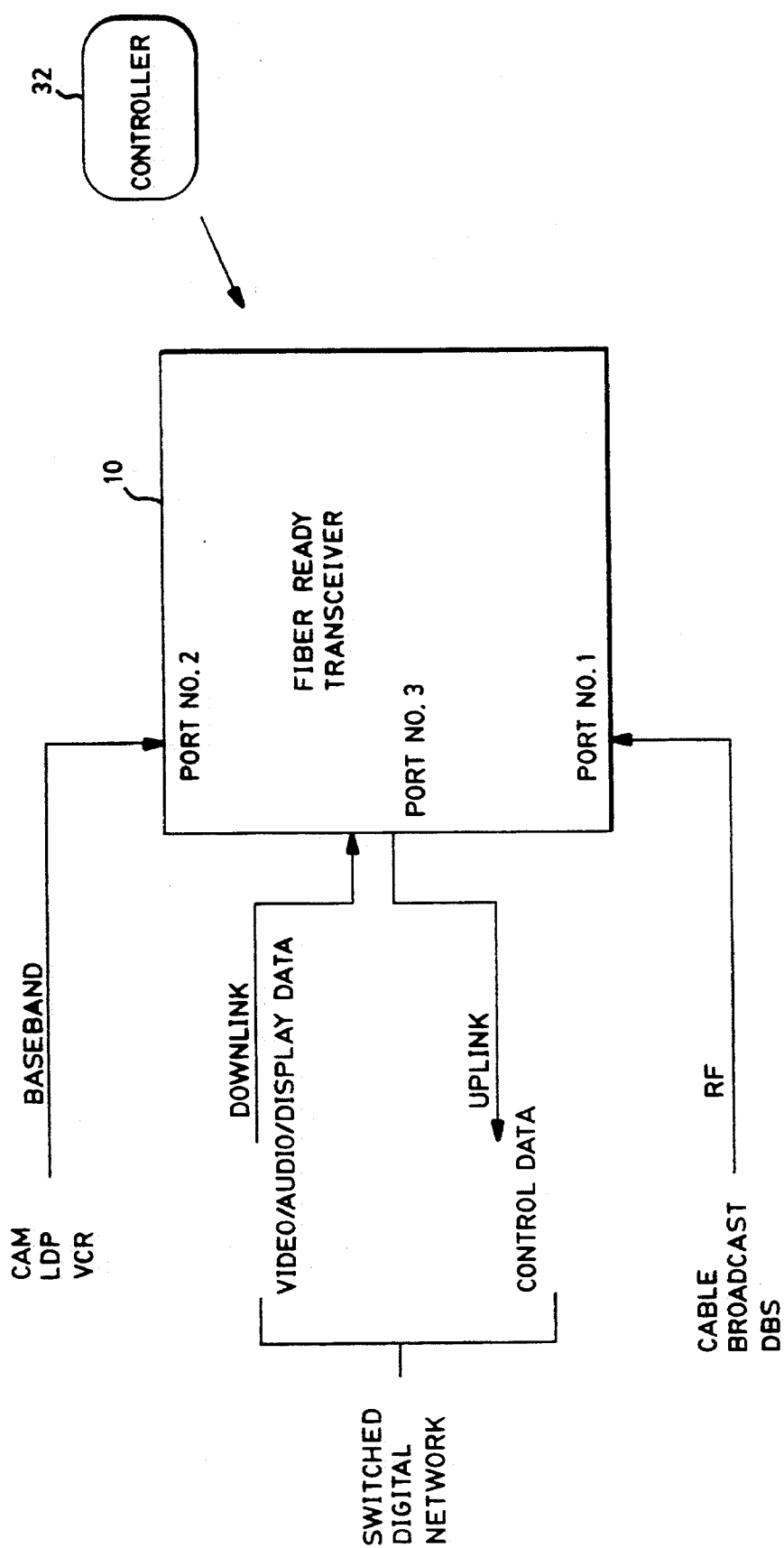
FIG. 1 is an interface diagram of the fiber-ready transceiver of the present invention.

FIG. 1 diagrammatically illustrates the interface of a fiber-ready transceiver 10 in accordance with the present invention. The transceiver 10 has at least three ports for receiving information: ports #1 and #2 receive signals conventionally applied to television receivers. In particular, port #1 receives RF signals from existing broadcast networks and CATV outlets via an antenna or coaxial cable, respectively; and port #2 receives video/audio baseband signals from commercial audio/video equipment such as camcorders and videocasette recorders (VCR) via baseband connectors.

Port #3 is coupled to the fiber-compatible network interface module of the present invention. As shown, port #3 is optically adaptable to receive digital video/audio signals and display data on a downlink channel from the switched digital network via an optical fiber, and to transmit control data to the switched network on an uplink channel. A controller 32 is operably connected to the fiber-ready transceiver 10 for generating the appropriate control data to request desired information and services from the switched digital network.

It should be obvious to those skilled in the art that the fiber-compatible transceiver 10 may have any number of ports because the components and circuitry for the indicated number of ports can be modified to process signals from additional ports.

Figure 2:
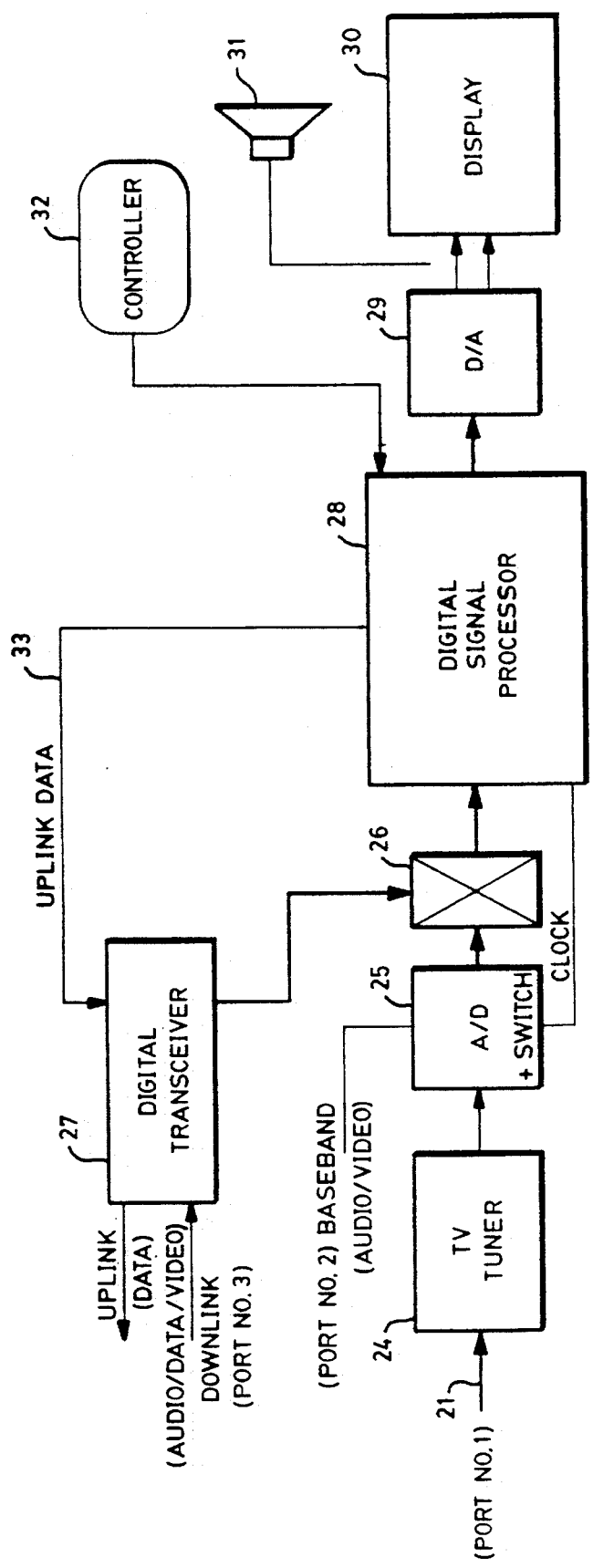
FIG. 2 is a block diagram of the transceiver in FIG. 1.

FIG. 2 is a block diagram of the fiber-ready transceiver 10 in FIG. 1. The broadcast video/audio signal coupled to port #1 is an RF signal with a vestigial sideband spectrum that is coupled by way of connection 21 to a conventional television RF tuner 24 which provides a baseband audio/video signal. The baseband audio/video signal applied to port #2 is coupled by way of connection 22 to a baseband switch. The baseband switch selects between the baseband signals from either the RF tuner or port #2, and drives the input of an analog-to-digital converter (ADC) with the selected baseband signal. The baseband switch and ADC are collectively referenced as element 25.

A dual input digital switch 26 receives one input from the ADC and the other from a fiber-ready digital transceiver 27 optically adapted to receive the downlink audio/data/video signal. Transceiver 27 is discussed below with reference to FIG. 3. The digital switch 26 selects one of the two audio/video sources and their respective clock signals, and couples the selected digital baseband signal (audio/video and clock) to digital signal processors (DSP) 28. The outputs from the DSP drive a digital-to-analog converter (DAC) 29 which provides analog input signals to a display module 30 and speaker 31 having transducers for viewing and listening, respectively.

The fiber-compatible digital transceiver 27 receives control data from the control processor 32 of the fiber-ready transceiver 10 by way of an uplink channel 33. The uplink data selects which information channel in the switched digital network is to be connected to port #3 and the transceiver 27 as a downlink channel. As indicated above, the downlink channel includes video/audio/data information that is time multiplexed within a serially transmitted digital signal.

Figure 3:
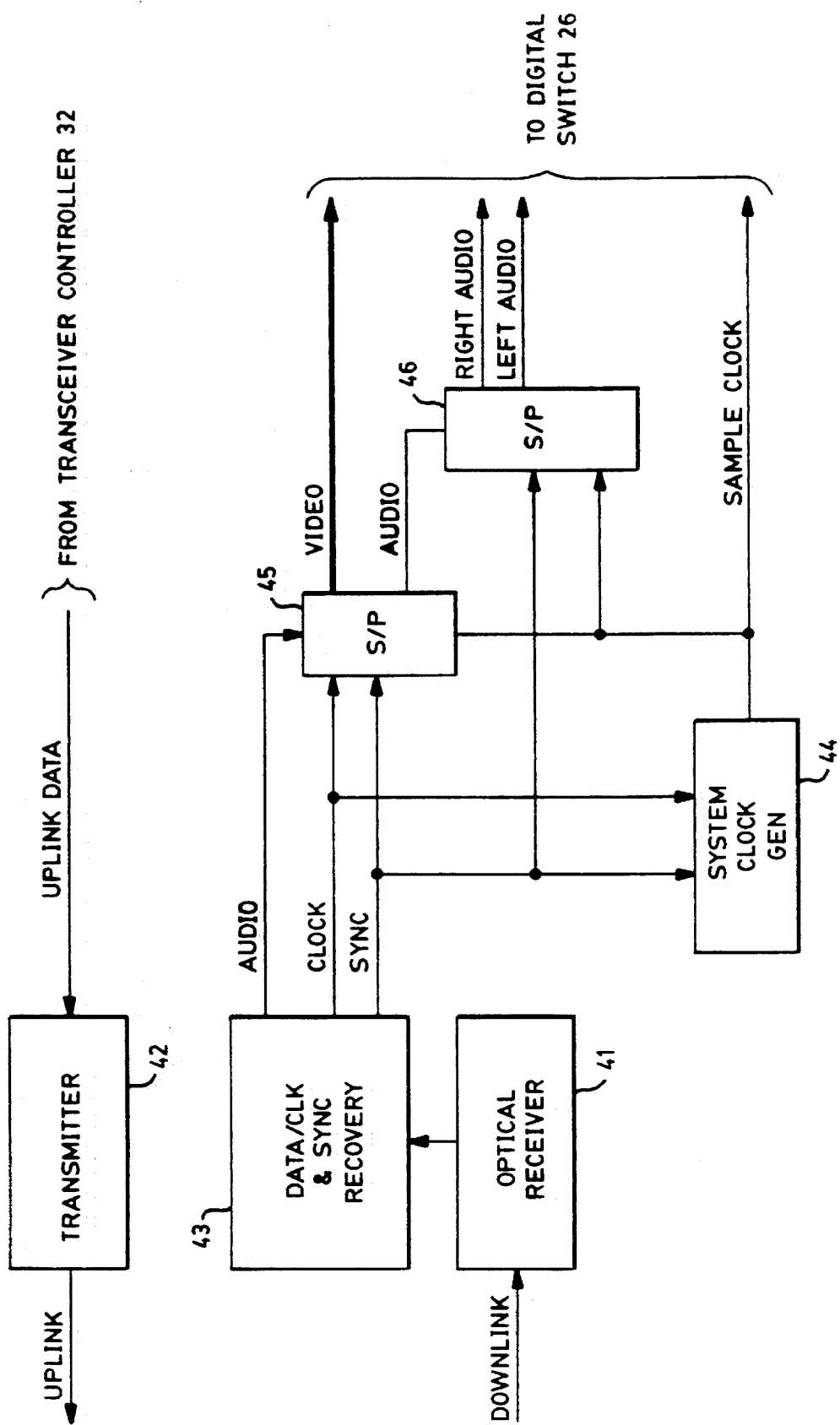
FIG. 3 is a functional block diagram of the digital transceiver in FIG. 2.
Figure 4A:
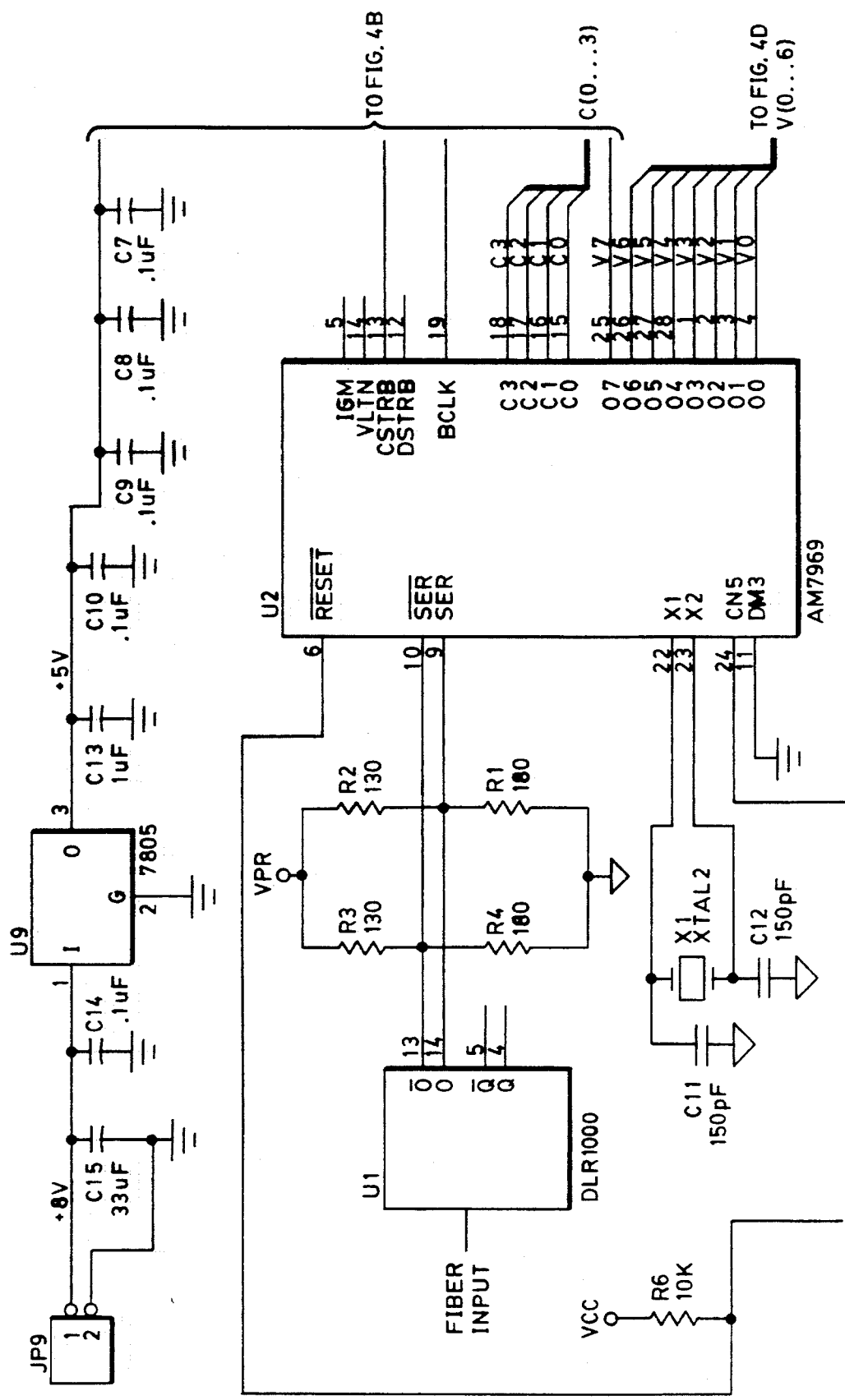
FIG. 4 is a schematic diagram of the digital transceiver in FIG. 3.
Figure 4B:
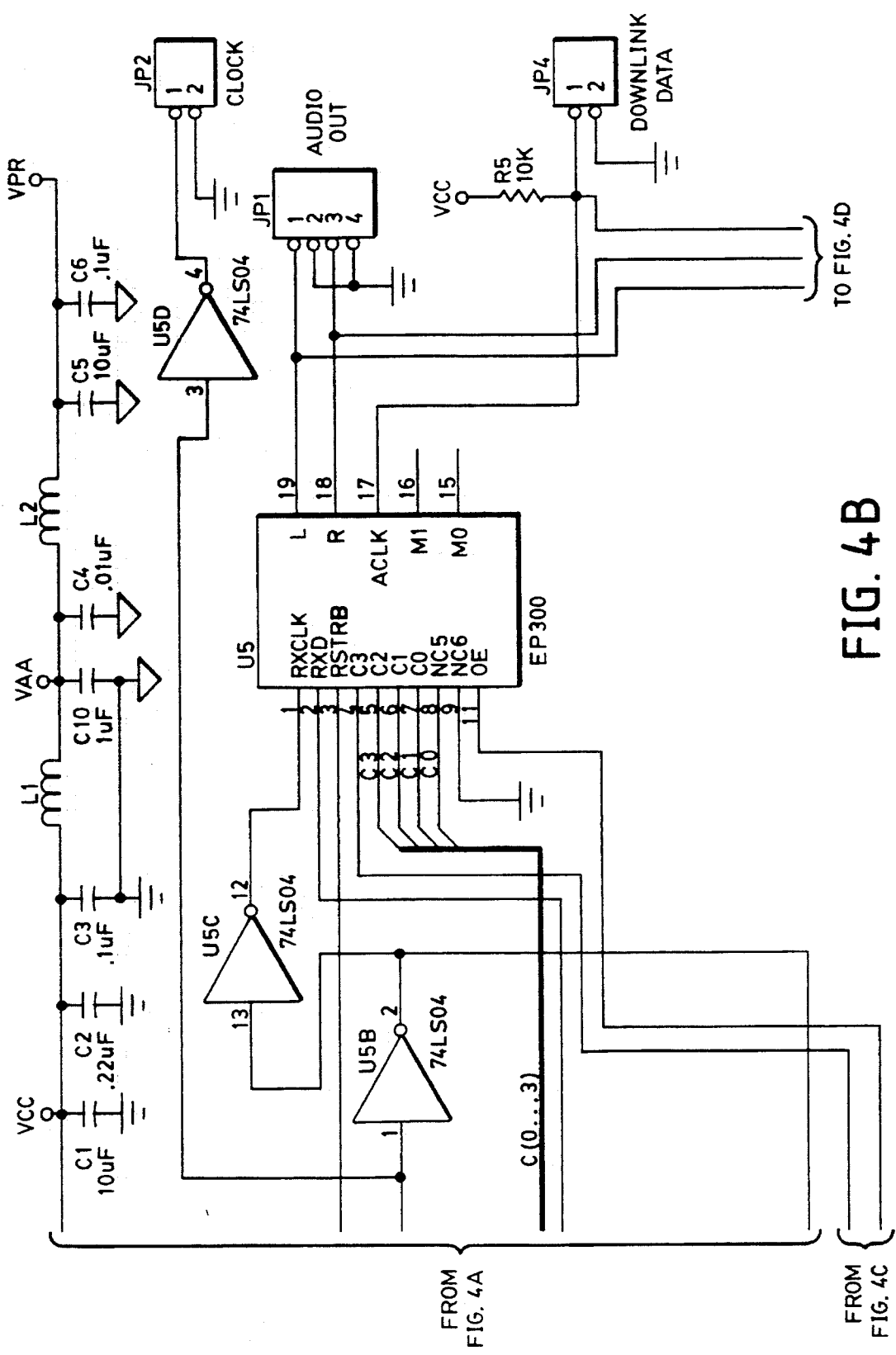
Figure 4C:
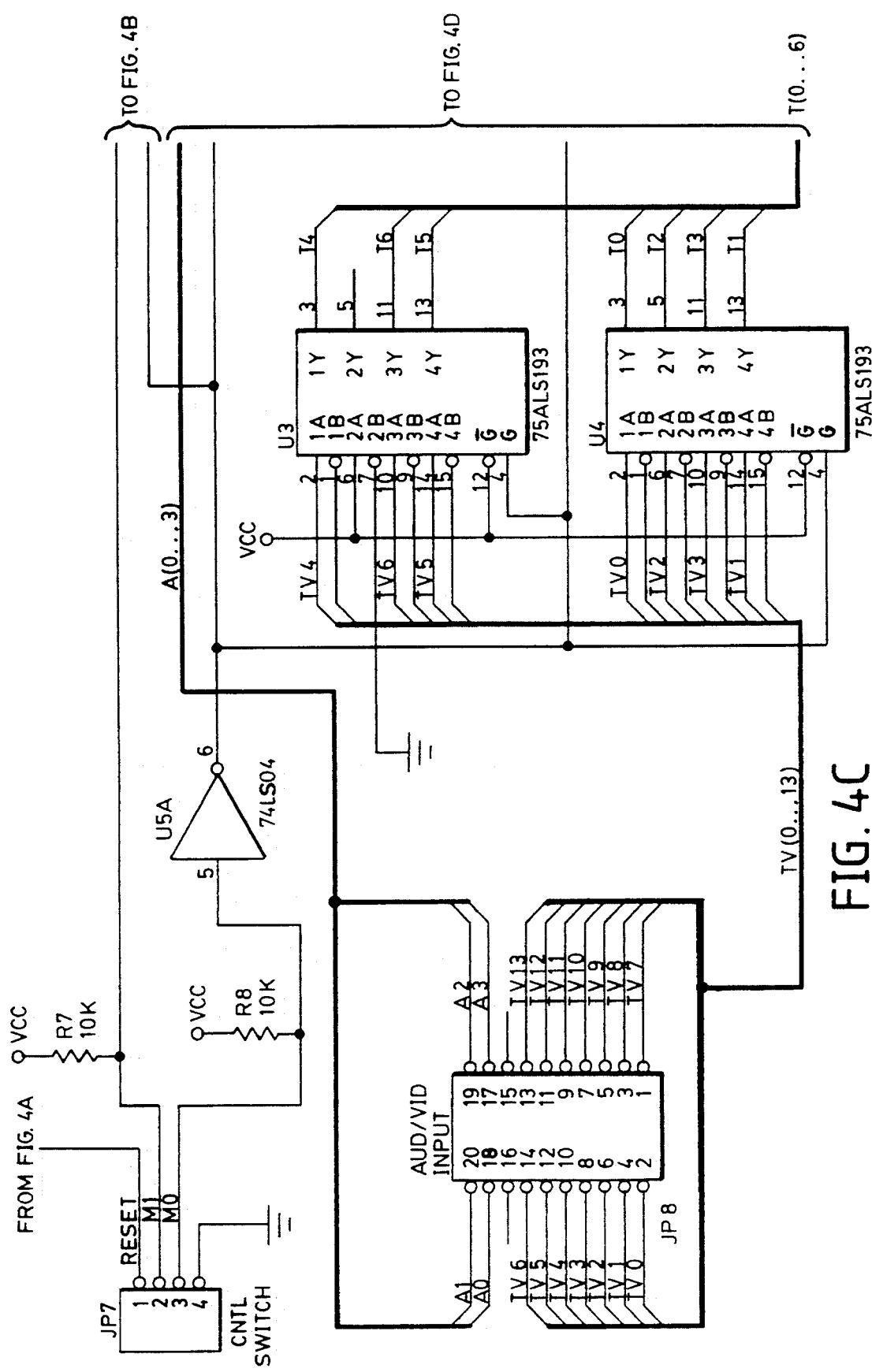
Figure 4D:
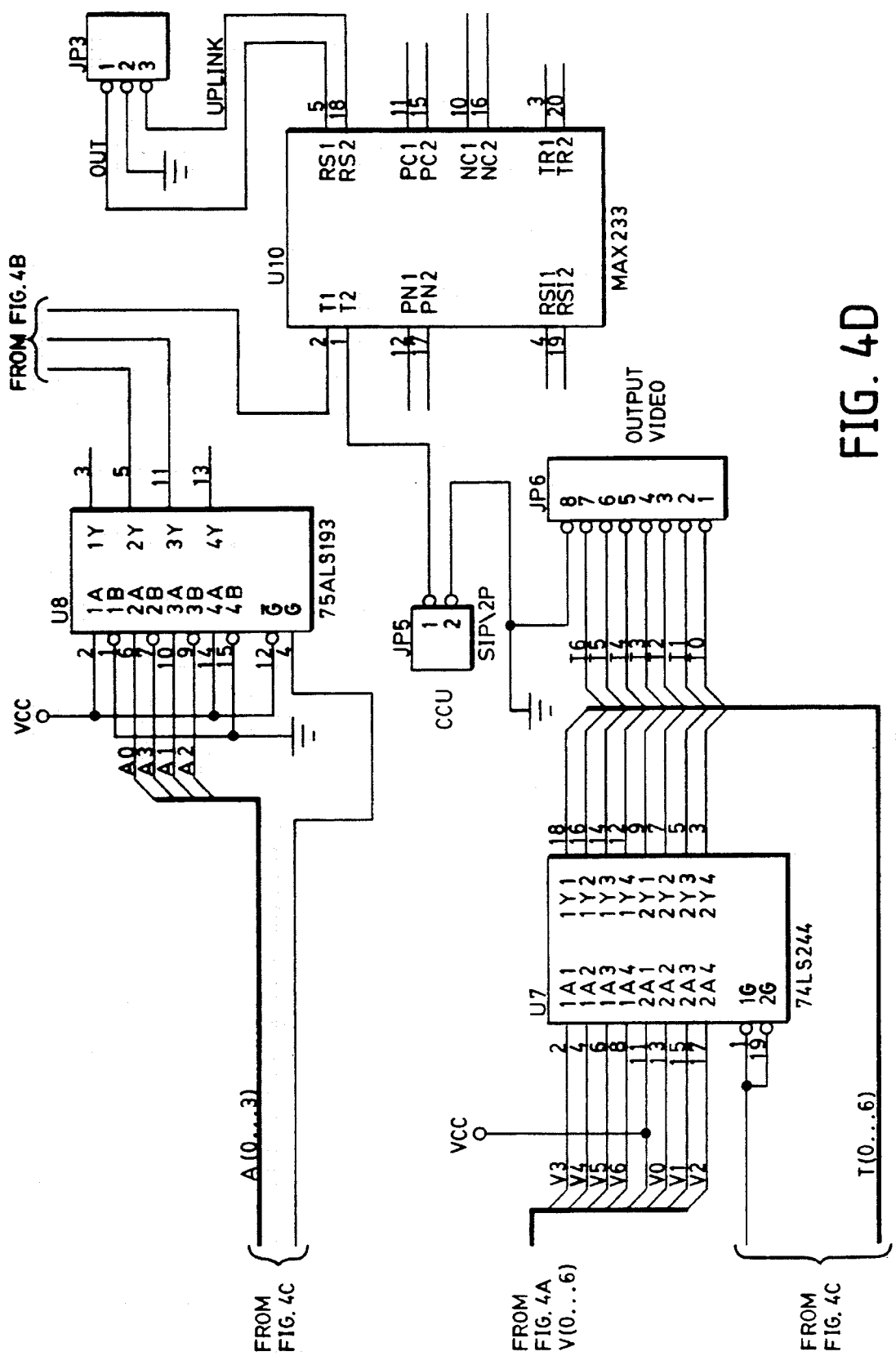

FIG. 3 is a functional diagram of the fiber-compatible digital transceiver 27 in FIG. 2. An optical receiver 41 detects the time-multiplexed audio/video/data signals transmitted as a serial bit-stream on the downlink channel. A transmitter 42 receives uplink control data from the transceiver controller 32, and transmits serial control data on an uplink channel. It should be obvious to those skilled in the art that although the downlink channels are optically transported, a variety of other suitable mediums are acceptable for coupling the digital transceiver 27 to the switched digital network.

The output of the optical receiver 41 is sent to a clock/sync/data recovery circuit 43 which recovers a clock signal, a synchronization signal, and an audio/data/video signal from the incoming serial bit-stream. A system clock generator 44 providing a sample clock is coupled with the serial audio/data/video bit-stream, the clock signal, and the sync signal to serial-to-parallel (S/P) signal processors 45 and 46 which convert the serial information into parallel samples containing audio (right and left), display data, and video information. The parallel information samples and the recovered sample clock are coupled to one of the inputs of digital switch 26 in FIG. 2.

FIG. 4 is a schematic diagram of the circuitry for receiving the downlink channel, processing the information in the downlink channel, and providing the parallel information samples and the recovered sample clock. Specifically, the circuitry performs the function of optical receiver 41, data/clock/sync recovery module 43, system clock generator 44, and serial-to-parallel processors 45 and 46 in FIG. 2.

The discussion of FIG. 4 is facilitated with the following exemplary embodiment of the present invention. In particular, audio and video signals that come into channel encoders coupled to the switched broadband network are sampled at 14.3 MHz and time multiplexed with data to create a 143-Mb/s encoded channel signal. Video signals are encoded into seven-bit video samples, and audio signals become alternating left/right, single-bit audio samples. Data is transmitted during the vertical blanking interval of the incoming video signal. The audio, data, and video samples are packed into eight-bit bytes and encoded to 10-bit words by a 4B/5B algorithm for error protection, byte synchronization, and clock recovery considerations. The 10-bit words are continuously shifted out of the encoder as a 143 Megabit/sec stream of bits which is routed by the switched broadband digital network to the appropriate fiber-compatible transceiver as a downlink channel.

Downlink data is provided to the fiber input of DLR1000 (corresponding to port #3), which outputs a serial bitstream at 143 Mb/s. The serial bitstream goes to an AMD7969 FDDI receiver corresponding to serial-to-parallel processors 43, 44, and 45, and recovers clock and synchronization signals. The FDDI receiver generates in parallel format the recovered sample clock BCLK (14.32 Mb/s bitstream), byte synchronization signal CSTRB, time-multiplexed audio sample V7, and video/data samples v[0:6].

The audio samples V7 are coupled, along with the recovered sample clock BCLK and the synchronization signal CSTRB, to a programmable array logic (PAL) chip EP300 corresponding to S/P 46 in FIG. 3 for generating the audio left bit L, the audio right bit R, and the audio clock ACLK. Thus, JP1 provides the left/right audio bit streams and JP4 provides the audio clock.

The digital baseband audio/video-data signal selected by the A/D converter-switch 25 in FIG. 2 is provided by JP8 as video-data signal word TV[0:13]and audio word A[0:3]. The audio word A[0:3]is coupled to a 75ALS193 (differential receiver for level shifting and switching) for generating the left and right audio bits (ports 2Y, 3Y) coupled to the audio out JP1. Signal TV[O:13]is applied to a pair of 75ALS193 which couple a signal T[0:6]to multiplexer (MUX) 74LS244, the IP300, 75ALS193, and the 74CS244 use tristate technology to select the appropriate digital signals for signal processing, and collectively correspond to digital switch 26 in FIG. 2.

The MUX responds to control signal MO from control switch JP7 to select either T[0:6]or V[0:6]for propagation to the video output JP6. The output video from JP6, the audio data from JP1, the audio clock from JP4, and the recovered clock signal BCLK from JP2 are coupled to the television receiver's signal processing circuitry represented by functional blocks 28, 29, 30, and 31 in FIG. 2 for displaying the video/data and generating the audio signal.

The transceiver controller 32 in FIG. 3 is the 8051 controller (see JP5 in FIG. 4). The uplink control channel from the fiber-ready receiver is an RS-232 port (see JP3 in FIG. 4) that is connected to the network via an RJ-11 jack. The control channel can be connected to the central office in a variety of methods: an ISDN data channel, an optical transmitter coupled into the downlink optical fiber, or via a second unit such as a fiber-ready camera used to provide two-way video connections between subscribers.

The home firmware is located in the fiber-ready television receiver. The firmware features include interactive teletext menus, network selection, cable ready tuning, stereo, customer preference control, and uplink control. The control port routines are the first line of processing to handle the subscriber's requests. This distributed processing limits the commands that the central software has to respond to and increases the overall response time of the system. In addition, the home firmware processes all customer preference controls and channel selection for all modes but the digital broadband network.

Customers can use the fiber-ready television receivers the same way they use a standard television receiver, but can now access advanced services through the video gateway of multiple networks. The consumer's remote control and an on-screen menu are used to select between services offered from the off-air antenna, cable, the in-home VCR, or the broadband telco fiber network. Once the optical fiber is installed, the fiber-ready receiver can be conveniently transported and connected to the network via a standard ST bulkhead connector mounted on the rear of the receiver.

In a broadband network for delivering information and services to subscribers, the network consists of three main functions: channel encoding, centralized broadband switching, and channel decoding. The channel encoder formats video, audio, and data into a time-multiplexed, serially transmitted digital bitstream. The output of the channel encoder goes to one input of a broadband digital switch, where it is connected through to one or more channel decoders. The switched broadband digital network provides high-capacity digital channels. The connection through the digital switch is controlled by network software under the direction of network subscribers. As noted above, a channel decoder is built into the fiber-ready television receiver to reconstruct the audio, data, and video for the subscriber. The subscriber controls program selection with the transceiver controller 32 by requesting that an input of the broadband switch be connected to the subscriber's channel decoder at the television receiver.

In a demonstration system built in accordance with the present invention, the digital switching network is implemented with a broadband digital switch based on the switch disclosed in copending application Ser. No. 347,370 filed May 4, 1989 and assigned to the same assignee as the present application. The switch is capable of point-to-point and point-to-multipoint connections. Based on the architecture shown in this copending application, the switch is constructed as a 64 input X 16 output integrated circuit fabricated in 1.2 μm CMOS. It is possible to array these switching modules to build much larger switching circuits. For example, the basic 64×16 module was used to create a 256×128 switch capable of 150-Mb/s per channel performance. This performance can be used to route 256 uncompressed NTSC signals to 128 customers.

Centralized broadband switching implies high-capacity signal switching and transport. The switching network preferably uses optical fibers to transport the 143-Mb/s signals from the central broadband switch to the receivers of the network subscribers. A 1300-nm laser diode transmitter is used to couple the digital signal into the optical fiber.

While there has been shown and described herein what are at present considered the preferred embodiments of the invention, it will be obvious to those skilled in the art that various changes and modification may be made therein without departing from the scope of the invention as defined by the appended claims.

What is claimed is:

1. A receiver, comprising:

a tuner adapted to receive an RF signal, and provide a baseband signal representative thereof;

a baseband switch operable to controllably select either the baseband signal from said tuner or an analog baseband signal from baseband source equipment;

an analog-to-digital converter (ADC) responsive to said selected baseband signal for providing a digital baseband signal representative thereof;

a digital transceiver having a fiber-compatible input adapted to receive signals from a downlink broadband digital channel, a data output for delivering data to an uplink channel, a digital input for receiving baseband uplink data from a controller, and a digital baseband output;

wherein said uplink and downlink channels form a bidirectional communications path with a broadband digital switching network;

a digital switch coupled to said digital transceiver and said ADC for controllably selecting either the digital baseband output of said digital transceiver or the digital signal from said ADC;

processors means coupled to the digital switch for performing digital signal processing of said selected digital baseband signal;

a digital-to-analog converter (DAC) responsive to the processed digital baseband signal for providing an analog signal representative thereof;

transducers coupled to the DAC for translating the analog signal into a viewing and listening format; and said controller being coupled to the digital switch, processor means, digital transceiver, and a subscriber selection keypad.

* * * * *